United States Patent

[11] 3,624,137

[72] Inventor Mahmoud S. Kablaoui
  Wappingers Falls, N.Y.
[21] Appl. No. 15,298
[22] Filed Feb. 27, 1970
[45] Patented Nov. 30, 1971
[73] Assignee Texaco Inc.
  New York, N.Y.

[54] NON-GEM POLYALKYLATED BENZENE DIACETATE PREPARATION
3 Claims, No Drawings

[52] U.S. Cl. .................................................. 260/479 R, 260/625
[51] Int. Cl. .................................................. C07c 69/16
[50] Field of Search ........................................ 260/479 R

[56] References Cited
OTHER REFERENCES

Doering et al., J. Am. Chem. Soc., Vol. 71, pages 2221–6 (1949).

Primary Examiner—James A. Patten
Attorneys—Thomas H. Whaley, Carl G. Ries and Robert A. Kulason ABSTRACT: A method of preparing a non-gem polyalkylated benzene diacetate of the general formula:

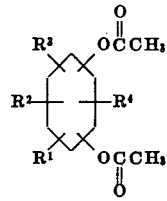

where $R^1$ and $R^2$ are alkyl and $R^3$ and $R^4$ are both hydrogen or alkyl comprising contacting with a mixture of concentrated sulfuric acid and acetic anhydride, a gem polyalkylated cyclohexanedione of the general formula:

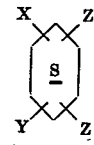

where X represents said $R^1$ and $R^2$ in gem position, Y represents said $R^3$ and $R^4$ in gem position, and Z represents keto oxygen.

NON-GEM POLYALKYLATED BENZENE DIACETATE PREPARATION

BACKGROUND OF INVENTION

This invention relates to the preparation of nongem polyalkylated benzene diacetates. The benzene diacetate products contemplated herein are readily converted by standard hydrolysis techniques to polyalkylated dihydroxybenzenes which are useful as dispersants in drilling muds.

The preparation of polyalkylbenzene diacetates from gem-polyalkylcyclohexanedione was not successful in the past. Previously, the formation of a nongem polyalkylated dihydroxybenzene from a gem alkylated precursor was accomplished by contacting a gem-dialkyl dihydroxybenzene with 5 percent oleum (e.g., 95 percent $H_2SO_4$+5 percent $SO_3$) in acetic anhydride to obtain the formation of gem-dialkyl dihydroxybenzene-2-sulfonic acid followed by refluxing the sulfonic intermediate with acetic anhydride to form nongem polyalkyl dihydroxybenzene. The yield was disappointing from a commercial point of view. Further, the past process required the employment of highly toxic and corrosive oleum which requires special handling and equipment undesirable adding to the manufacturing cost.

DESCRIPTION OF THE INVENTION

I have discovered and this constitutes my invention a method of directly aromatizing a gem-polyalkylcyclohexanedione in a single step in substantially improved yields, e.g., 60–90 percent or more and without the need to employ toxic oleum. Further, the nongem benzene diacetate products formed by the method of the invention are readily converted with negligible loss in yield by standard hydrolysis techniques to corresponding polyalkylated dihydroxybenzenes.

More specifically, the invention comprises the preparation of nongem polyalkylated benzene diacetates of the formula:

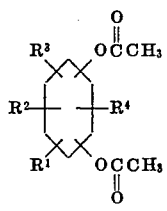

where $R^1$ and $R^2$ are nongem alkyl of from one to 20 carbons and both $R^3$ and $R^4$ are either hydrogen or nongem alkyl of from one to 20 carbons comprising contacting a gem polyalkylated cyclohexanedione of the general formula:

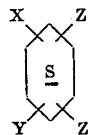

where X is said $R^1$ and $R^2$ in gem position and Y is said $R^3$ and $R^4$ in gem position and having a nonsubstituted ring carbon adjacent to each gem ring carbon and Z is keto oxygen, with a mixture of concentrated sulfuric acid and acetic anhydride in a mole ratio of said sulfuric acid to said cyclohexanedione of at least about 0.1:1 and up to 10:1 or more, preferably between about 0.5:1 and 1.5:1, and a mole ratio of said acetic anhydride to said sulfuric acid of at least about 1:1 and up to 100:1 or more, preferably between about 5:1 and 20:1. The reaction temperature employed is at least about 30° C. and up to 200° C. or more, preferably the refluxing temperature of the solvent diluent when said refluxing temperature is between about 80° and 150° C. If temperatures above the boiling point of the reactants and/or diluent are utilized superatmospheric pressure is contemplated. The reaction is advantageously conducted for a period of between about 0.5 and 4 hours or until the economics of product yield versus reaction time dictates reaction termination. Further, the method is preferably conducted in an inert atmosphere such as nitrogen and also under conditions of agitation to facilitate ingredient contact. At the end of the reaction period there is recovered via standard means a nongem polyalkylated benzene diacetate as heretofore defined.

This aromatization-acylation-rearrangement combination reaction can be conducted using excess acetic anhydride as the solvent diluent or a volatilizable inert solvent diluent may be employed such as xylene, acetic acid, toluene, benzene, heptane, hexane, carbon tetrachloride, chlorobenzene and cyclohexane. The solvent diluent amounts advantageously constitute between about 10 and 90 wt. percent basis the reaction mixture.

One standard means of isolating the diacetate product is accomplished by distilling off the excess volatile solvent and unreacted acetic anhydride followed by quenching the residue in between about 1 and 100 volumes water/volume residue, at a temperature between about 0° and 50° C., washing the solvent layer with an aqueous alkali base, e.g., 0.1 to 7 wt. percent aq. sodium bicarbonate in water, extracting out the diacetate with a water immisible volatilizable solvent such as ether, benzene, chloroform and carbon tetrachloride. The volatilizable solvent is then fractionally distilled leaving the purified benzene diacetate product as residue.

The benzene diacetate can be converted, if desired, into the corresponding dihydroxybenzene by standard hydrolysis techniques. One standard means is contacting the diacetate with a dilute aqueous mineral acid, e.g., aq. HCl of an acid strength between about 0.1 and 1 wt. percent using diacetate to aqueous acid weight ratio of between about 1:2 and 1:100 at a temperature between about 0° and 100° C., most preferably under reflux conditions, to hydrolyze the diacetate to said corresponding dihydroxybenzene. Subsequently, the formed dihydroxy compound is extracted from the hydrolysis mixture and purified by the same technique described heretofore in respect to benzene diacetate recovery.

One of the criticalities of the method of the invention is the use of the concentrated sulfuric acid-acetic anhydride combination. If other mineral acids such as hydrochloric or phosphoric acid are substituted for the sulfuric acid and/or materials closely related to acetic anhydride such as acetic acid are substituted therefor, no aromatization, acylation and or alkyl rearrangement takes place to form said benzene diacetate. Another material feature is the maintenance of the mole ratios of reaction ingredients within the prescribed limits. Use of the reaction ingredients outside these limits result in many instances in the exclusive formation of the nonaromatic monoenol acetate derivative of the ketone. Still another criticality is that the carbon containing the gem dialykyl groups in the cyclohexanedione reactant should be adjacent to nonsubstituted carbon. For example, when 2,2-dialkyl-1,3-cyclohexanedione is utilized in the method of the invention no aromatization or diacylation takes place.

Hereinbefore and hereinafter by the term "concentrated sulfuric acid" I intend an acid consisting of between about 95 and 100 wt. percent $H_2SO_4$ and between about 0 and 5 wt. percent $H_2O$.

Examples of the cyclohexanedione reactants contemplated herein are 4,4-dipropyl-1,3-cyclohexanedione; 3,3-diethyl-1,2-cyclohexanedione; 4,4-dihexyl-1,2-cyclohexanedione; 6,6-dimethyl-1,4-cyclohexanedione; and 2,2,6,6,-tetramethyl-1,4-cyclohexane-dione. Corresponding benzene diacetates are 4,5-dipropylresorcinol diacetate; 3,4-diethylcatechol diacetate; 3,4-dihexylcate-chol diacetate; 5,6-dimethylhydroquinone diacetate and tetra-methylhydroquinone diacetate. Corresponding dihydroxybenzene derivatives are: 4,5-dipropylresorcinol; 3,4-diethylcatechol; 3,4-dihexyl-catechol; 5,6-dimethylhydroquinone; and tetramethylhydroquinone.

The following examples further illustrate the invention but are not to be construed as limitations thereof.

EXAMPLE I

To a 300 mls. 3 necked Pyrex flask equipped with a magnetic stirrer, glass sparger, thermometer and distilling head, there was charged 10 grams of 5,5-dimethyl-1,3-cyclohexanedione and 100 mls. of acetic anhydride. The reaction mixture was then cooled to about 10° C. and 7 grams of concentrated (96 wt. percent) sulfuric acid were added slowly so the temperature would not rise over 15° C. The mixture was heated to reflux (140° C.) while dry nitrogen was passed through a rate of 140 mls./minute. After 1 hour of reflux the apparatus was arranged for distillation and 85 mls. of solvent (10 mls. acetic acid and 75 mls. acetic anhydride) were collected. The residue was cooled and quenched in 200 mls. of ice water, extracted with 200 mls. of ether, the ether layer was washed with 100 mls. of 7 wt. percent aqueous sodium bicarbonate and dried. Upon distillation of the residue 11.8 grams of 4,5-di-methylresorcinol diacetate representing a yield of 75 wt. percent basis cyclohexanedione reactant were isolated.

The recovered dimethylresoricinol diacetate was then contacted with 150 grams of 0.2 wt. percent aqueous hydrochloric acid and the resultant aqueous solution was extracted with 200 mls. of ether and the ether extract subjected to distillation to remove said ether leaving 4,5-dimethylresorcinol residue in an amount of 7.2 grams representing a yield of 73 wt. percent based on said initial cyclohexanedione reactant.

EXAMPLE II

The procedure of example I was repeated in separate runs. Each run was identical to said procedure with the following exceptions. In Run A no sulfuric acid was employed. In Run B phosphoric acid was substituted for sulfuric acid and in Run C hydrochloric acid was substituted for sulfuric acid. In Run D acetic acid was substituted for acetic anhydride. In Run E catalytic amount of sulfuric acid (0.32 gram) was substituted for 7.0 grams of sulfuric acid. At the end of each of the above reactions, no recovery of diacetate was obtained resulting in no production of dimethylresorcinol diacetate.

EXAMPLE III

The procedure of example I was repeated using 2.0 grams of 2,2-dimethyl-1,3-cyclohexanedione, 1.6 grams of concentrated sulfuric acid and 50 mls. of acetic anhydride. Spectral analysis of the residue obtained after work-up determined no aromatic diacetate product was formed.

I claim:

1. A method of producing a nongem polyalkylated benzene diacetate of the formula:

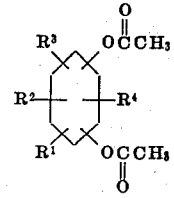

where $R^1$ and $R^2$ are alkyl of from one to 20 carbons and $R^3$ and $R^4$ are both hydrogen or alkyl of from one to 20 carbons comprising contacting a gem-polyalkylated cyclohexanedione of the general formula:

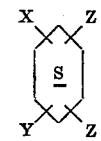

where X is said $R^1$ and $R^2$ in the gem position, Y is said $R^3$ and $R^4$ in the gem position when alkyl, the gem carbon being adjacent to at least one unsubstituted carbon in the ring and Z is keto oxygen with a mixture of concentrated sulfuric acid and acetic anhydride in a first mole ratio of said sulfuric acid to said cyclohexanedione of at least about 0.1:1 and a second mole ratio of said acetic anhydride to said sulfuric acid of at least about 1:1 at a temperature of at least about 30° C. to form said nongem polyalkylated benzene diacetate.

2. A method in accordance with claim 1 wherein said first mole ratio is between about 0.5:1 and 1.5:1 and said second mole ratio is between about 5:1 and 20:1 and said temperature is between 80° and 150° C.

3. A method in accordance with claim 2 wherein said cyclohexanedione is 5,5-dimethyl-1,3-cyclohexanedione, and said diacetate is 4,5-dimethylresorcinol diacetate.